United States Patent [19]
Waidhas et al.

[11] Patent Number: 5,189,770
[45] Date of Patent: Mar. 2, 1993

[54] METHOD OF MAKING SOLID ELECTROLYTE CAPACITOR

[75] Inventors: Manfred Waidhas, Nuremberg; Kurt Pantel, Heroldsberg; Gerhard Richter, Erlangen, all of Fed. Rep. of Germany

[73] Assignee: Siemens Aktiengesellschaft, Munich, Fed. Rep. of Germany

[21] Appl. No.: 742,843

[22] Filed: Aug. 8, 1991

[30] Foreign Application Priority Data

Aug. 13, 1990 [DE] Fed. Rep. of Germany ....... 4025617

[51] Int. Cl.$^5$ .................. B21F 41/00; H01G 9/00; H01G 9/02
[52] U.S. Cl. .................. 29/25.03; 361/523; 361/525; 361/527
[58] Field of Search ............ 29/25.01, 25.03; 361/527, 525, 523

[56] References Cited

U.S. PATENT DOCUMENTS

| | | | |
|---|---|---|---|
| 4,580,855 | 4/1986 | Niwa | 361/433 |
| 4,609,971 | 9/1986 | Shaffer | 361/433 |
| 4,803,596 | 2/1989 | Hellwig et al. | 361/525 |
| 4,805,074 | 2/1989 | Harakawa et al. | 29/25.03 |
| 4,858,078 | 8/1989 | Morimoto et al. | 361/527 |
| 4,910,645 | 3/1990 | Jonas et al. | 361/525 |
| 5,017,272 | 5/1991 | Kamigawa | 204/56.1 |

FOREIGN PATENT DOCUMENTS

| | | |
|---|---|---|
| 0285728 | 10/1988 | European Pat. Off. |
| 63-268235 | 11/1988 | Japan ................ 29/25.03 |
| 1-074711 | 3/1989 | Japan ................ 29/25.03 |
| 843785 | 8/1960 | United Kingdom ........ 29/25.03 |

OTHER PUBLICATIONS

Chemical Abstract 112(18):170577s; 107(26):248455u 113(8):69688z; 114(16):155462y; 114(14):134459n; 105(24):217629h; 115(26):293075w; 112(10):89782h; 110(14):127082y.
Vol. 13, No. 235 (E-766) [3583] Patent Abstract of Japan No. 1-42113 (Sakamoto) (May 30, 1989).
"Chemical Abstracts", vol. 110 (1989), No. 26, 241310w.
"Chemical Abstracts", vol. 111 (1989), No. 6, 49055w.
"Chemical Abstracts", vol. 111 (1989), No. 16, 145285s.
"J. Electrochem. Soc.", vol. 133 (1986), pp. 310-315.
"J. Electrochem. Soc.", vol. 133 (1986), pp. 2206-2207.
"Synth. Met.", vol. 36 (1990), pp. 275-281.

Primary Examiner—Olik Chaudhuri
Assistant Examiner—R. Paladugu
Attorney, Agent, or Firm—Kenyon & Kenyon

[57] ABSTRACT

Solid electrolyte capacitors are produced in such a way that a formed metallic anode body which has pores passing through it is arranged on a working electrode, and a conductive polymer is deposited in the pores of the anode body by electrochemical polymerization of a monomer in the liquid phase, in the presence of a conducting salt. The polymer is provided with a contact point.

18 Claims, 1 Drawing Sheet

METHOD OF MAKING SOLID ELECTROLYTE CAPACITOR

FIELD OF THE INVENTION

The invention relates to a method for the production of a solid electrolyte capacitor.

BACKGROUND OF THE INVENTION

Electrolyte capacitors such as aluminum and tantalum capacitors with a liquid electrolyte were already replaced with those having a solid electrolyte quite some time ago. In the case of tantalum capacitors, in particular, manganese dioxide is used as the solid electrolyte. For this purpose, manganese nitrate is brought into the porous surface of the metal anode and pyrolyzed, using a complicated, multi-stage process. In addition to the technological effort involved, another disadvantage is that during the pyrolysis or sintering process, aggressive nitrogen dioxide ($NO_2$) is released, which can result in damage to the metal oxide serving as the dielectric. This is counteracted in that the oxide layer which occurs as a result of forming is made thicker than necessary. However, as a consequence capacity losses have to be accepted.

Electrolyte capacitors which contain electrically conductive organic complex salts on the basis of 7,7,8,8,-tetracyano-1,4-quinodimethane (TCNQ) as the solid electrolyte are also already known (see, for example, U.S. Pat. No. 4,580,855). However, a disadvantage of these TCNQ complexes, which are applied to the formed, i.e. oxidized metal surface in the molten state, is that they can only be worked or melted at temperatures at which their stability limit is already reached, and that over time—especially when overheated—they split off hydrocyanic acid and therefore have a toxic and corrosive effect (see EP-OS 0 340 512).

It is also known to use conductive polymers as the solid electrolyte in electrolyte capacitors (see, for example, EP-OS 0 135 223, 0 264 786 and 0 340 512). Such solid electrolyte capacitors have the advantage, as compared with conventional capacitors with liquid electrolyte, that the electrolyte cannot run out or evaporate. Furthermore, the power loss, i.e. the ESR ("electrolytic serial resistance") is less. In comparison with other solid electrolyte capacitors, better frequency behavior and better capacity utilization can be expected, in addition to advantages from a technological point of view.

The major problem in the implementation of an electrolyte capacitor with a conductive polymer as the solid electrolyte is the efficient placement of the polymer into the anode, which generally has a highly porous surface structure. This is because etched films or sintered compacts produced with extremely fine powder achieve high volume capacities.

Conductive polymers are usually produced by means of electrochemical polymerization (of corresponding monomers), i.e. deposited onto a substrate. Since this deposition presupposes an electron-conductive substrate, this method of procedure cannot be easily transferred to the production of solid electrolytes for electrolyte capacitors. This is because the formed metal anodes of electrolyte capacitors demonstrate dielectric properties.

Methods in which electrochemical polymerization on an aluminum substrate takes place first, and the dielectric barrier layer is only produced afterwards, by application of an external voltage, are known (see EP-OS 0 283 239 and 0 285 728 in this regard). However, a drawback is that the polymer properties are adversely influenced by the subsequent forming process; in addition, the homogeneous formation of the dielectric is disrupted by the polymer.

In other known methods, the problems mentioned are circumvented by the fact that chemical polymerization processes are used. According to EP-OS 0 340 512, the use of polythiophenes with a specific structure as the solid electrolyte in electrolyte capacitors is known. The polythiophenes are produced on metal foils covered with an oxide layer on one side, which are used as anodes, by applying monomeric thiophenes and oxidation agents, preferably in the form of solutions, either separately one after the other, or preferably together, onto the side of the metal foils covered with the oxide layer; the oxidative polymerization is completed, if necessary, by heating the coating. If the thiophene monomer and the oxidation agent are applied separately, the metal foils are preferably first coated with a solution of the oxidation agent and subsequently with the thiophene solution. The solvents are removed by evaporation at room temperature, after the solutions have been applied.

Coating of the anodes can also take place by means of gas phase polymerization (see in this regard: JP-OS 63-314823 and/or "Chemical Abstracts," Vol. 111 (1989), No. 16, 145285s, and JP-OS 01-012514 and/or "Chemical Abstracts," Vol. 110 (1989), No. 26, 241310w). For this, a formed aluminum anode, for example, is first treated with a solution of an oxidation agent, and then exposed to a monomer, such as pyrrole.

A polypyrrole solid electrolyte can also be produced in such a manner (see in this regard: JP-OS 01-049211 and/or "Chemical Abstracts," Vol. 111 (1989), No. 6., 49055w) that the anode is first impregnated with a solution of the monomer and then treated with a solution of an oxidation agent.

The methods of the type mentioned above, in which polymerization takes place by the chemical route, demonstrate a number of disadvantages. The following points are particularly significant:

1. The reduced form of the oxidation agent remains in the polymer layer. This reduces the conductivity of the layer, and furthermore, the stability of the polymer can be adversely influenced and the dielectric can be damaged.

2. Due to the volume loss during the evaporation of the solvent, i.e. due to the fact that deep, fine pores are not reached, filling of the pores is not efficient.

3. The required solutions can generally be processed only over a very limited period of time, i.e. for approximately 1 to 2 h (see EP-OS 0 340 512 in particular, in this regard).

SUMMARY OF THE INVENTION

It is an object of the invention to provide a method for the production of solid electrolyte capacitors, in which conductive polymers can be brought into the pore structure of substrates which serve as anodes in the capacitors, in efficient manner.

In accordance with the invention this is achieved by arranging a formed metallic anode body, which has pores passing through it, on a working electrode, and depositing a conductive polymer in the pores of the anode body by electrochemical polymerization of a monomer in the liquid phase, in the presence of a conducting salt, and providing the polymer with a contact point.

DETAILED DESCRIPTION OF THE INVENTION

Figure 1:
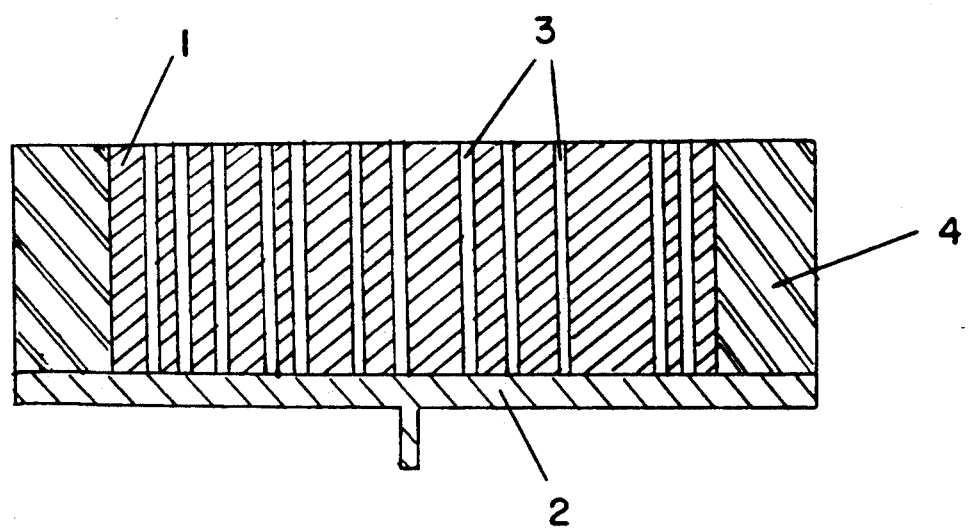
FIG. 1 illustrates a formed metallic anode body on a working electrode used in the method of producing the solid electrolyte capacitor of the invention.

The term conducting salt, within the scope of the present patent application, designates chemical compounds which must fulfill two functions. For one thing, they must lend the liquid phase (i.e., the electrolyte) electrical conductivity, and for another, the anion of these compounds must serve for doping the polymer, as a rule. For this reason, free acids, for example phosphoric acid, can also function as a "conducting salt."

In the method according to the invention, it is essential that the conductive polymer is deposited electrochemically. For this reason, the disadvantages mentioned above under Points 1 and 3 are eliminated a priori. Furthermore, with this method, the greatest possible degree of filling of the pore structure is achieved (see Point 2 in this regard), specifically because the starting point is substrates, i.e. anode bodies, with pores passing through them. These anode bodies are arranged more or less as a mask in front of a working electrode, so that during the deposition process, growth of the polymer takes place exclusively in the pores. The polymer grows through the pores of the anode body, starting from the working electrode; the deposition is ended when the surface of the anode body facing away from the working electrode is covered with a thin polymer layer. In this manner, the entire surface of the dielectric is utilized, so that capacitors with a high capacity are obtained.

It is true that it is known to produce conductive polymers in the pores of so-called host membranes (see in this regard: "J. Electrochem. Soc.," Vol. 133 (1986), pages 310 to 315 as well as pages 2206 and 2207). However, this essentially serves for the production of polymers with a fiber-shaped microporous structure. For this, $Al_2O_3$ membranes with a thickness of approximately 50 $\mu$m, having linear cylindrical pores with a diameter of 0.2 $\mu$m, are used, for example (see in this regard: "Synth. Met.," Vol. 36 (1990), pages 275 to 281). In order to be able to deposit polypyrrole in the pores electrochemically, one surface of the membrane has to be built up as an electrode. For this purpose, a thin gold film is first sputtered onto this surface (thickness: approximately 50 nm), and contacted by means of a copper wire; then a thick gold layer is applied to this film by galvanostatic electroplating, i.e. galvanically, and covered with epoxy resin. After the polypyrrole has been deposited in the pores, the host membrane is dissolved (by means of NaOH), leaving isolated polypyrrole fibers, i.e. fibers surrounded by empty spaces, which represent the micropores.

In contrast to this, an electrode/electrolyte unit for solid electrolyte capacitors is produced with the method according to the invention. With this method, it is also not necessary to build up a surface of the substrate, i.e. the anode body, as an electrode, in complicated manner; rather, the anode body is simply arranged in front of a working electrode. Nevertheless, the formed anode bodies hereby are efficiently provided with the conductive polymer, despite their electrically insulating oxide layer. Under certain circumstances, it could, however, be practical to provide the surface of the anode body facing the working electrode with a contact aid, which can be done very easily in that this surface is coated with graphite or conducting silver, for example. In this way, uniform growth of the polymer is guaranteed.

With the method according to the invention, deposition of the polymer takes place on the formed surface of the anode body, i.e. on the dielectric, in a conventional electrochemical cell or electrolysis apparatus. For this, a working electrode as well as a counterelectrode and a reference electrode are required. Furthermore, a potentiostat or other external current source is needed. It must be possible to polarize the working electrode as an anode, which is the normal situation, or as a cathode. For this purpose, it consists of electronically conductive material, such as gold, nickel, titanium, alloy steel and carbon; preferably, a working electrode made of platinum or graphite is used. For this purpose, gold-plated or platinum-plated electrodes, for example, can also be used.

The anode body 1 is placed onto the working electrode 2 and lightly pressed on in its edge zones (see FIG. 1); preferably, a formed metal foil or a formed metallic sintered compact is used as the anode body. When using metal foils, deposition of the polymer can also take place in that the foil is guided over a roller wired as an anode, which is partially arranged in the electrolyte.

It is advantageous if the material for the anode body is a so-called valve metal, which is particularly understood to mean aluminum, titanium, zirconium, niobium, hafnium, tantalum and tungsten; preferably, aluminum or tantalum is used. As examples of this, aluminum foils, preferably with a thickness of 50 to 300 $\mu$m, and sintered compacts on the basis of tantalum, will be mentioned. The metallic anode bodies, which have pores 3 passing through them (pore diameter: approximately 0.2 to 5 $\mu$m), are formed, i.e. all the surfaces and also the pore walls are covered with oxide and are therefore non-conductive.

Electrochemical deposition of the polymer, which is normally not possible, due to the anodic barrier properties of the foil or the sintered compact, takes place, in the method according to the invention, because substrates with pores passing through them are used. The anode bodies function only as a type of mask with this method, so that an exclusive growth of the polymer in the pores is forced. Accordingly, other areas of the working electrode which are accessible to the electrolyte must be screened off by screen 4 (see FIG. 1).

With the method according to the invention, the polymerization of the monomer takes place in the liquid phase. For this, a solventless liquid monomer can be used, with conductive salt added to it. Preferably, however, a monomer solution is used for polymerization. This solution then also contains the conductive salt, i.e. in this case, the electrolyte is a solution of the conductive salt, to which the monomer is added. The solvent itself can be protic or aprotic. Preferably, an organic solvent is used for this, such as acetonitrile, nitromethane, dimethyl formamide, dimethyl sulfoxide, dichloromethane, propylene carbonate and acetone. In the case of organic solvents which are miscible with water, a small amount of water can be added to them, in general up to 3% by weight, to increase the conductivity.

Under some circumstances, however, water or a dilute acid can also be used as the solvent.

The concentration of the monomer in the solution is generally 0.001 to 2 mole/L, preferably 0.01 to 0.2 mole/L. Common compounds which can be electrochemically polymerized are used as monomers; these are, in particular, compounds from the group of 5-ring heterocyclic compounds. Preferably, pyrrole and thiophene, in unsubstituted form or in substituted form, i.e. derivatives thereof, serve as the monomer. Because of their special stability, those derivatives which carry alkyl or alkyloxy groups in the 3 or 4 position are preferred. In addition, aniline and derivatives of it, in particular, are also possibilities.

The electrochemical polymerization of the monomer takes place in the presence of a conductive salt. The conductive salts used for this are preferably alkali, alkaline earth and ammonium salts of organic or inorganic acids; in addition, phosphonium salts are also possible. The acids, i.e. the anions, can be freely selected from a broad range. For example, perchlorate, sulfate and toluene sulfonate can serve as anion; preferably, phosphate is used, which can also be the case in the form of the (free) acid. Furthermore, complex anions, such as tetrafluoroborate or hexafluorophosphate, and polymer anions, such as polyvinyl sulfonate, can also be used. In general, the anions should be selected in such a way that they cannot penetrate the dielectric and therefore do not intensify the self-discharge of the capacitor; large anions and polyvalent anions are therefore especially suitable. The conductive salt concentration is generally 0.001 to 1 mole/L, preferably 0.01 to 0.1 mole/L.

The deposition of the polymer takes place under constant voltage, in potentiostatic, galvanostatic or potentiodynamic manner. The potential range, i.e. the current density can be varied within a broad range, but a potential which is characteristic for the monomer in question must be exceeded. The current density is generally between 0.01 and 1000 mA/cm$^2$, depending on the monomer concentration. Advantageously, the current density is between 0.1 and 50 mA/cm$^2$ during deposition of the polymer, preferably the work range is between 0.5 and 20 mA/cm$^2$. The electrochemical polymerization is generally carried out at room temperature and under inert gas. However, the temperature can be varied within a broad range, especially to achieve special polymer properties.

The end of the deposition process has been reached when the polymer first grows through individual pores of the anode body, and then covers the entire area of the surface of the anode body facing away from the working electrode. The end point of deposition can also be determined by coulometric measurements or with the use of other physical measurement techniques. After the deposition is complete, the anode body is taken off the working electrode and removed from the deposition apparatus. After evaporation of the monomer or the solvent, the polymer is end-contacted, i.e. electrically connected with cathode contact means.

To the extent necessary, post-forming can take place for the capacitors according to the invention, i.e. any defects in the dielectric which have occurred can be healed. This can take place by applying an external voltage, which exceeds the rated voltage by 10 to 100%, to the finished capacitor, possibly in defined humidity and also at temperatures up to 100° C.; this results in exponential damping of the current. This process is terminated when the flowing current goes below the values which can be tolerated for the residual current. As an alternative, post-forming can also take place in that the anode body provided with the polymer is put under anode stress against a conventional counterelectrode, in an electrolyte usual for forming; it is practical if the voltage is 50 to 100% of the anode-specific forming voltage in this case.

The invention will be understood in greater detail from the following examples which should be regarded in an illustrative rather than a restrictive sense.

EXAMPLE 1

A 0.1 molar solution of 3-methyl thiophene in acetonitrile is placed into an electrochemical cell; LiClO$_4$, also in 0.1 molar concentration, serves as the conductive salt. A formed anode film made of aluminum with pores passing through it (pore diameter: approximately 1 μm) is fixed on the working electrode, which consists of platinum, in suitable manner; the free parts of the working electrode are covered with a screen. Deposition of the polymer takes place potentiostatically, at a potential of 1800 mV, measured against a calomel reference electrode. The deposition process is terminated when the polymer has coated the entire surface of the aluminum foil. The foil is then removed from the cell and, after evaporation of the solvent, end-contacted using known techniques.

A capacitor produced in the manner described above, end-contacted with conductive silver, possesses a capacity of 0.5 to 0.6 μF/cm$^2$, i.e. approximately 90 to 100% of the original wet capacity of 0.52 to 0.57 μF/cm$^2$, each measured at 120 Hz. With this, a degree of coverage (degree of filling) which represents what can be achieved with the state of the art is reached. However, the known disadvantages of chemical deposition of the polymer do not occur in this case. But due to the higher conductivity of the electrolyte (approximately 10 to 100 S/cm), compared with MnO$_2$ (approximately 1 S/cm), or liquid electrolytes (approximately 0.5 S/cm), a lower ESR and a better high-frequency behavior are achieved: The loss factor tan δ at 10$^4$ Hz is ≦0.4; with known aluminum and tantalum capacitors, this value is 0.5 and 0.4, respectively.

EXAMPLE 2

With a method of procedure corresponding to Example 1, the surface of the anode foil which faces the working electrode is coated with a contacting aid, such as graphite or conductive silver. In this manner, it is guaranteed that a particularly uniform growth of the polymer will take place.

EXAMPLE 3

Capacitors with corresponding properties such as the capacitors produced according to Example 1 or 2 are also obtained if a formed tantalum sintered compact is used as the anode body, instead of a formed aluminum foil.

EXAMPLE 4

Capacitors with corresponding properties such as the capacitors produced according to Example 1 or 2 are also obtained if the polymerization takes place galvanostatically, at a current density of 5 mA/cm$^2$.

EXAMPLE 5

Capacitors with corresponding properties such as the capacitors produced according to Example 1 or 2 are also obtained if the work is carried out at a monomer concentration of 2 mole/L.

EXAMPLE 6

Capacitors with corresponding properties such as the capacitors produced according to Example 1 are also obtained if a 0.1 molar solution of pyrrole in acetonitrile serves as the electrolyte, and if tetrabutyl ammonium toluene sulfonate (0.1 mole/L) is used as the conductive salt. Deposition takes place galvanostatically at 2 mA/cm$^2$ in this case.

EXAMPLE 7

Capacitors with corresponding properties such as the capacitors produced according to Example 6 are also obtained if work is carried out solvent-free. In this case, 0.25 mole/L tetramethyl ammonium toluene sulfonate is added to the pure monomer as the conductive salt.

EXAMPLE 8

Capacitors with corresponding properties such as the capacitors produced according to Example 1 to 7 are also obtained if a graphite disk serves as the working electrode. Replacement of the platinum with the graphite does not have any negative effect on the efficiency of the deposition process.

EXAMPLE 9

With a method of procedure corresponding to Examples 1 to 4, aniline is used as the monomer; 1 molar phosphoric acid serves as the electrolyte.

A capacitor produced in this manner demonstrates a loss factor tan δ (at 10$^4$ Hz) of ≦0.15. In comparison with a capacitor corresponding to Example 1 or 2, lower residual currents occur here when an external voltage (10 V) is applied: approximately 50 nA/μF. In contrast to this, the residual current for known aluminum capacitors is approximately 200 nA/μF (at a voltage of 10 V).

We claim:

1. A method for the production of a solid electrolyte capacitor, comprising the steps of: arranging a formed metallic anode body, which has pores passing through it, on a working electrode; depositing a conductive polymer in the pores of the anode body by electrochemical polymerization of a monomer in the liquid phase, in the presence of a conducting salt; removing the anode body from the working electrode; and providing the polymer with a contact.

2. The method according to claim 1 wherein the anode body is a metal foil.

3. The method according to claim 1 wherein the anode body is a sintered compact.

4. The method according to claim 1 wherein the anode body is made of a valve metal.

5. The method according to claim 4 wherein the valve metal is selected from the group consisting of aluminum and tantalum.

6. The method according to claim 1 wherein the conducting salt is dissolved in a solution of the monomer.

7. The method according to claim 6 wherein the solution has a concentration of the monomer of 0.001 to 2 mole/L.

8. The method according to claim 7 wherein the concentration of the monomer in the solution is 0.01 to 0.2 mole/L.

9. The method according to claim 6 wherein the solution has a concentration of the conducting salt of 0.001 to 1 mole/L.

10. The method according to claim 9 wherein the concentration of the conducting salt in the solution is 0.01 to 0.1 mole/L.

11. The method according to claim 1 wherein the step of depositing of the polymer is conducted at a current density of between 0.1 and 50 mA/cm$^2$.

12. The method according to claim 1 wherein the monomer is selected from the group consisting of pyrrole, thiophene, aniline and derivatives thereof.

13. The method according to claim 1 wherein the conducting salt is selected from the group consisting of: alkali, alkaline earth and ammonium salts of an organic acid; the corresponding free organic acid; alkali, alkaline earth and ammonium salts of an inorganic acid; and the corresponding free inorganic acid.

14. The method according to claim 13 wherein the inorganic acid is phosphoric acid.

15. The method according to claim 1 wherein the working electrode is comprised of platinum or graphite.

16. The method according to claim 12 wherein the conducting salt is selected from the group consisting of: alkali, alkaline earth and ammonium salts of an organic acid; the corresponding free organic acid; alkali, alkaline earth and ammonium salts of an inorganic acid; and the corresponding free inorganic acid.

17. The method according to claim 16 wherein the inorganic acid is phosphoric acid.

18. The method according to claim 11 wherein the current density is between 0.5 and 20 mA/cm$^2$.

* * * * *